(12) United States Patent
Kavanaugh et al.

(10) Patent No.: US 6,223,233 B1
(45) Date of Patent: Apr. 24, 2001

(54) WALLET FOR PERSONAL INFORMATION DEVICE

(75) Inventors: Paul K. Kavanaugh, Eastampton; Mark M. Todorovich, Medford Lakes; Robert L. Grieb, Medford, all of NJ (US)

(73) Assignee: Xircom, Thousand Oaks, CA (US)

( * ) Notice: Subject to any disclaimer, the term of this patent is extended or adjusted under 35 U.S.C. 154(b) by 0 days.

(21) Appl. No.: 09/189,572

(22) Filed: Nov. 11, 1998

Related U.S. Application Data

(63) Continuation-in-part of application No. 09/028,367, filed on Feb. 24, 1998, now Pat. No. 5,978,591.

(51) Int. Cl.⁷ .................................................. G06F 13/10
(52) U.S. Cl. ..................... 710/73; 710/72; 710/102; 713/310; 713/320; 713/324
(58) Field of Search ................... 710/62–64, 72, 710/73, 74, 102, 103, 129, 101; 713/320, 321, 324, 310

(56) References Cited

U.S. PATENT DOCUMENTS

| | | | |
|---|---|---|---|
| 5,039,846 | * 8/1991 | Komaki | 235/1 D |
| 5,070,329 | * 12/1991 | Jasinaki | 340/825.44 |
| 5,245,346 | * 9/1993 | Nishimura et al. | 342/42 |
| 5,521,369 | * 5/1996 | Kumar | 235/472 |
| 5,530,235 | * 6/1996 | Stefik et al. | 235/492 |
| 5,594,680 | * 1/1997 | Ohtake et al. | 365/63 |
| 5,619,396 | * 4/1997 | Gee et al. | 361/686 |
| 5,822,600 | * 10/1998 | Hallowell et al. | 713/340 |
| 5,848,298 | * 12/1998 | Steere, Jr. et al. | 710/62 |
| 5,873,108 | * 2/1999 | Goyal et al. | 707/507 |
| 5,991,839 | * 11/1999 | Ninomiya | 710/101 |
| 5,995,373 | * 11/1999 | Nagai | 361/755 |
| 6,069,648 | * 5/2000 | Suso et al. | 348/14 |

* cited by examiner

*Primary Examiner*—Thomas Lee
*Assistant Examiner*—Ilwoo Park
(74) *Attorney, Agent, or Firm*—Christie, Parker & Hale, LLP

(57) ABSTRACT

A wallet for a personal information device in the form of a PCMCIA card such as an PCMCIA-card electronic organizer. The wallet includes an input device separate from the input device of the personal information device and two halves that may be folded together in a wallet-like fashion. One of the halves generally includes a touch panel input to allow a user to enter information, commands, instructions, etc., thereto. A personal information device is mounted to the second half of the wallet. When mounted, the wallet supplies via an electrical connection or induction communication the user-supplied information entered into the touch panel input to the personal information device. The wallet display may be powered by the personal information device via the electrical connection or self-powered. Upon coupling the personal information device to the wallet, the personal information device may supply a wake signal to wake up or automatically turn on the input device of the wallet. The wallet may further include an input/output connector for coupling via a cable the wallet to an external device such as another wallet, a personal computer, etc.

8 Claims, 10 Drawing Sheets

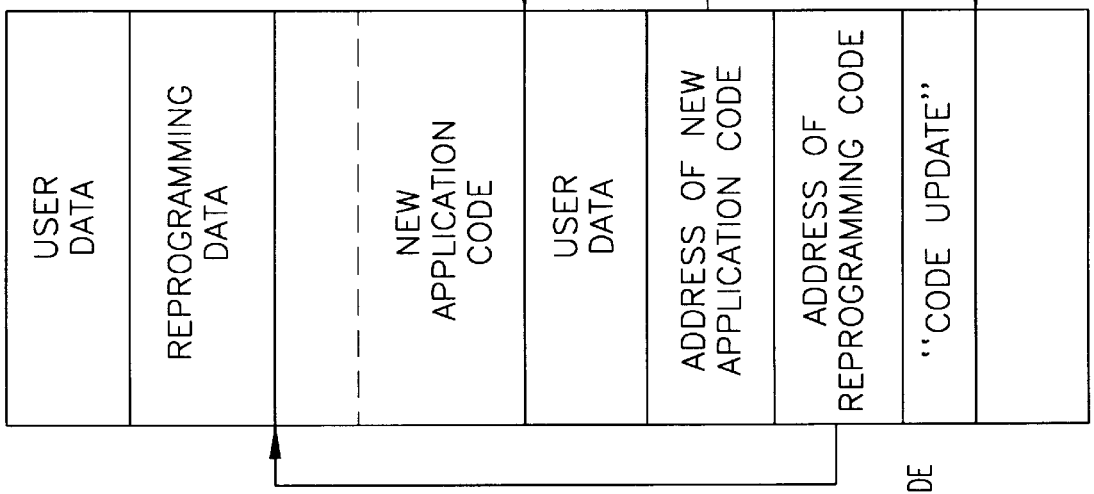
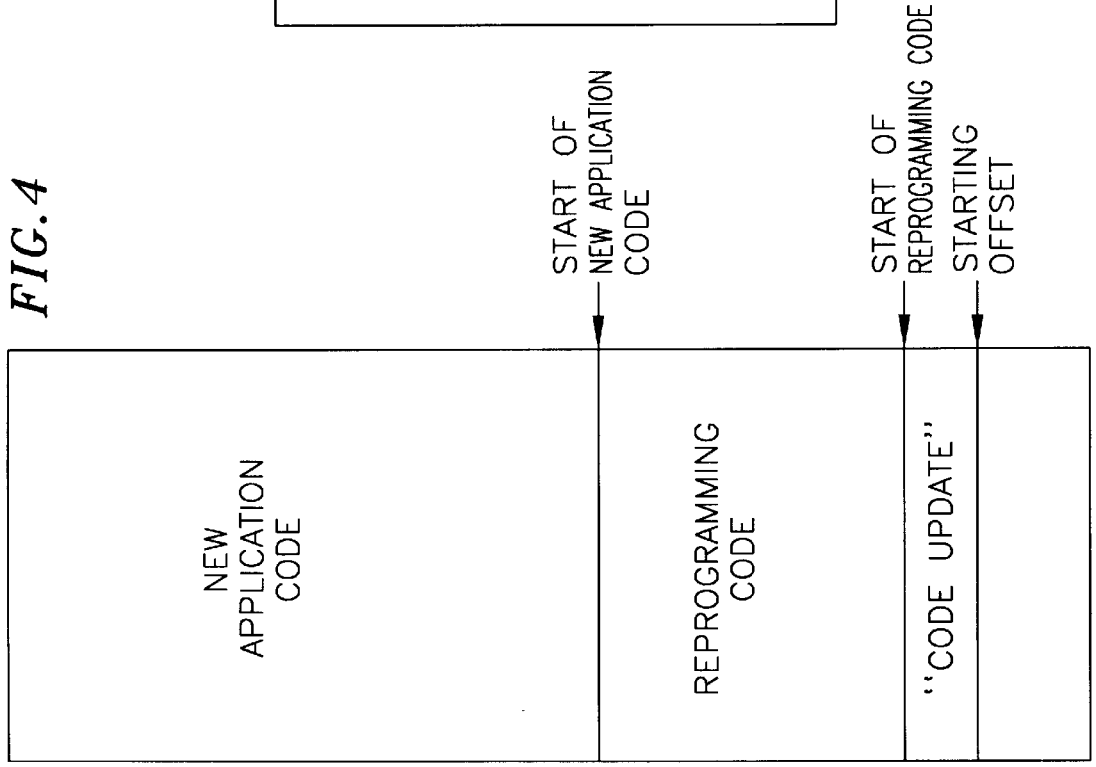

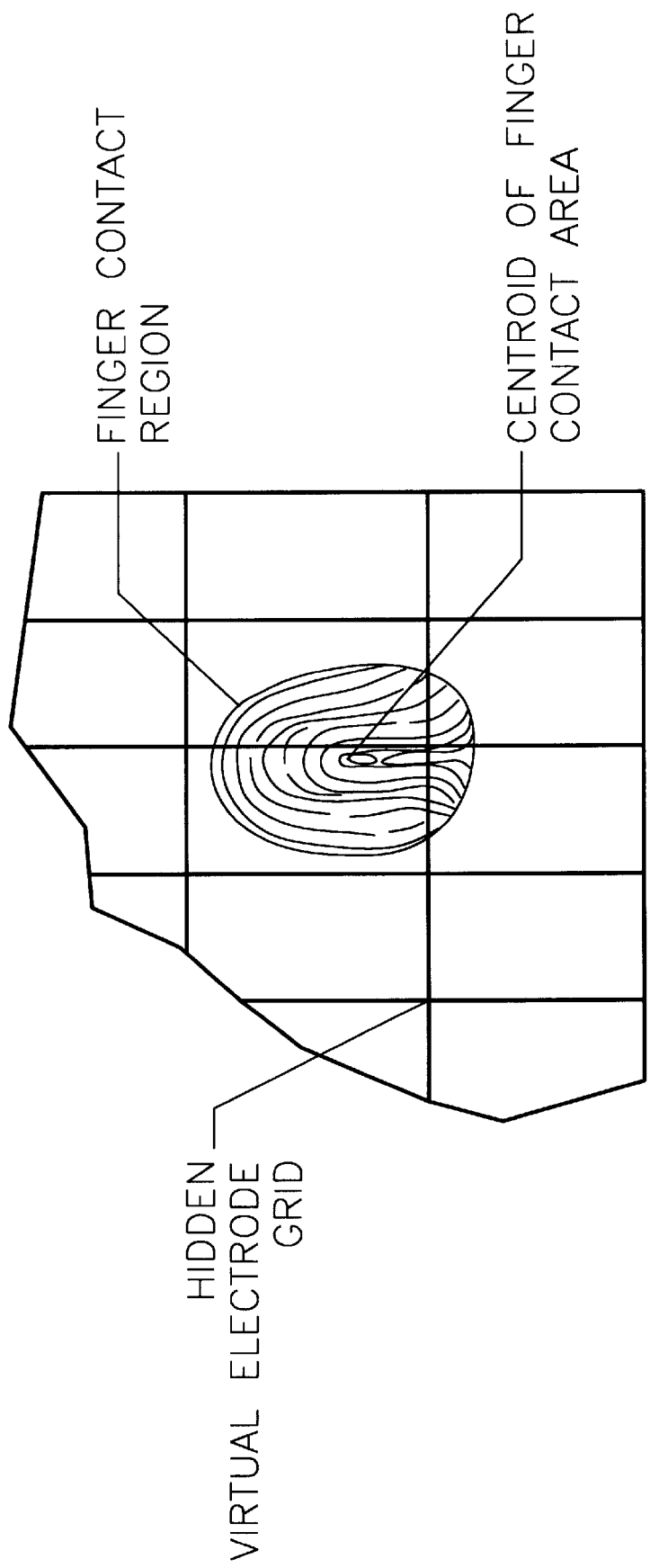

WALLET FOR PERSONAL INFORMATION DEVICE

RELATED APPLICATION

This is a continuation-in-part of U.S. patent application Ser. No. 09/028,367, filed Feb. 24, 1998, now U.S. Pat. No. 5,978,591, and entitled personal information device and method for downloading reprogramming data from a computer to the personal information device via the pcmcia port or through a docking station with baud rate conversion means. The disclosure of U.S. patent application Ser. No. 09/028,367 is incorporated herein by reference.

BACKGROUND OF THE INVENTION

The present invention relates to a wallet for a personal information device, e.g., an electronic organizer, and, more particularly, to a wallet having a touchpad and, optionally, a PCMCIA connector therein for use in combination with a personal information device.

Recently, there has been a trend to develop and utilize compact and pocket-size electronic devices, such as compact computers (notebook computers), compact electronic personal organizers, compact electronic dictionaries, compact electronic encyclopedias, and so on. As such devices become smaller in size, various problems result, including a reduction in the ease of their operation due to, for example, reduced-sized keys, reduced-sized displays and/or reduced number of keys thereon.

Recent developments have attempted to overcome this problem as well as other problems that are inherent in compact and pocket-sized electronic devices. For example, many compact electronic personal organizers are now equipped to communicate with a personal computer, wherein a user enters various data, e.g., telephone numbers, appointments, etc., into the computer which then transmits or downloads that entered data to the compact electronic personal organizer for storage therein. This technique provides two advantages over previous devices. Data is more easily entered with a full sized keyboard than with a reduced-size keypad. Data is entered only once to utilize organizer programs running on both the personal computer and the compact electronic personal organizer.

While the above-mentioned and other developments have produced more user friendly, easier to use and more sophisticated compact organizers, there still is a need for a personal information device, e.g., an electronic personal organizer, that is yet smaller in size than existing devices and easier to use, and which is designed to allow for easier development of software-driven features therein.

There also is a need to provide accessories for use with these personal information devices that make such devices even easier to use.

Therefore, it is an object of the present invention to provide a wallet for use with a micro-sized personal information device which makes the micro-sized personal information device easier to use than without the wallet.

Various other objects, advantages and features of the present invention will become readily apparent to those of ordinary skill in the art, and the novel features will be particularly pointed out in the appended claims.

SUMMARY OF THE INVENTION

In accordance with an embodiment of the present invention, a wallet is provided for use with a personal information device comprising a first portion (i.e., a first half) that includes an input device (e.g., a touch-panel, a touch pad in the form of a keyboard) for receiving a user-supplied entry, and a second portion (i.e., a second half) that is rotatably coupled to the first portion. The second portion is adapted to receive and detachably retain a personal information device in the form of a PCMCIA card, and the second portion is operable to supply via an electrical connection to the personal information device the user-supplied entry that is received by the input device.

As an aspect of the present invention, the wallet is operable to receive from the personal information device control data, and the input device is a touch-sensitive display device that is operable to display information to the user in accordance with the control data.

As another aspect of the present invention, the wallet includes a memory having pre-stored therein a plurality of sets of display data, and each set of display data represents a respective display that is displayable on the touch-sensitive display device.

As a further aspect of the present invention, the wallet includes a PCMCIA port adapted to receive the PCMCIA I/O port of the personal information device.

As an additional aspect of the present invention, the wallet includes an I/O connector that can be coupled via a cable to an external device such as a computer or another wallet having mounted therein another personal information device.

In accordance with another embodiment of the present invention, the combination of a wallet and a personal information device includes a wallet first half that includes an input device for receiving a user-supplied entry, a wallet second half that is rotatably coupled to the first half, and a personal information device in the form of a PCMCIA card mounted in the wallet, wherein the personal information device includes a display for displaying information to the user, an input device for receiving a user-supplied input, and input means for receiving data from the wallet when the personal information device is mounted therein. The wallet second half also includes an output for providing the user-supplied entry to the personal information device.

In accordance with a further embodiment of the present invention, the combination of a personal information device and a wallet includes a personal information device having a display, an input device and an induction coil, and a wallet having an input device and an induction coil. The wallet is adapted to receive and detachably retain the personal information device. The induction coil of the personal information device and the induction coil of the wallet are adapted to communicate with each other without electrical contact therebetween when the personal information device is retained by the wallet.

As an aspect of this embodiment, the personal information device controls its induction coil to supply a wake signal to the wallet, and the input device of the wallet is adapted to be automatically turned on when the wallet's induction coil receives the wake signal.

As another aspect of this embodiment, the input device of the wallet is adapted to turn off if the wallet induction coil does not receive a wake or stay-awake signal within a predetermined period of time after receiving a previously supplied wake or stay-awake signal.

In accordance with an additional embodiment of the present invention, a method of communication between a personal information device and a wallet is carried out by mechanically coupling the personal information device to the wallet, supplying from the personal information device to the wallet a wake signal after the personal information device and the wallet are coupled, receiving by the wallet the wake signal supplied by the personal information device, and turning on the input device of the wallet automatically in response to the wallet receiving the wake signal.

As an aspect of this embodiment, the wake signal is supplied by the induction coil of the personal information device and the induction coil of the wallet receives the wake signal.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 4 is a data structure of dual-ported memory 22 in accordance with the present invention;

FIG. 5 is a data structure of dual-ported memory 22 in accordance with another embodiment of the present invention;

FIG. 13 schematically illustrates the operation of the touch-pad of wallet 70 of the present invention.

DETAILED DESCRIPTION OF CERTAIN PREFERRED EMBODIMENTS

This continuation-in-part application is directed to a wallet for use with a personal information device. A detailed discussion of the personal information device, which is the claimed subject matter of a parent application, is first provided, followed by a detailed discussion of the wallet of the present invention.

Personal Information Device

The personal information device of the present invention is a micro-sized device that has the form of a PCMCIA card and that includes therein an LCD display screen and navigation buttons. As will be discussed, the personal information device (PID) provides various organizer or other types of features to a user and may be inserted within a PCMCIA port (also identified as a PC-card slot) of a personal computer for downloading of various information from the computer to the personal information device. Also, and as will be discussed, the personal information device may communicate with a personal computer via a docking station. The personal information device of the present invention, as described herein, is an electronic personal organizer having various organizer features and functions and, thus, is also identified herein as an organizer. However, the personal information device of the present invention may embody functions and features that are not considered to be so-called organizer functions and, thus, the present invention is not to be limited to electronic organizers.

Figure 1:
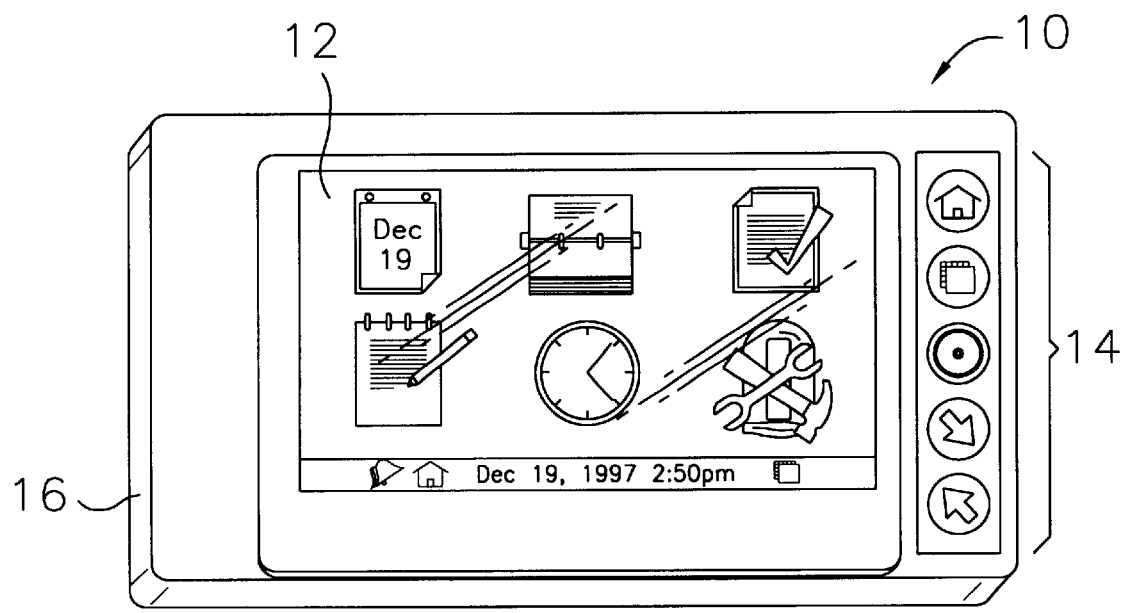
FIG. 1 is a schematic illustration of personal information device 10 of the present invention.

Referring now to the drawings, FIG. 1 is an exemplary illustration of the personal information device 10 of the present invention. As shown, personal information device 10 has a PCMCIA (Personal Computer Memory Card International Association) compatible form factor and includes a flat panel display 12, for example, an LCD display screen, various buttons 14 and a PCMCIA port 16. Display 12 and buttons 14 are within the form factor of the PCMCIA card and, thus, personal information device 10 having such display and buttons may be inserted into the PCMCIA port of a personal computer. During "standard" operation of the personal information device, that is, when the device is not coupled to a computer, various organizer features are provided to a user. For example, and as shown on display 12 of the exemplary illustration of FIG. 1, the various organizer features may be provided in the form of a menu having selectable entries therein. In the exemplary embodiment, the various organizer features of personal information device 10 include a schedule/appointment calender, a telephone directory, a "to do" list, a memo holder, various time clocks and user customization, with each organizer function having a respective icon on the displayed menu. Using the appropriate input buttons 14, the user selects any one of the displayed icons to implement the corresponding organizer feature, and upon selection of an organizer feature, a submenu or other display is provided.

Figure 2:
FIG. 2A–2F emplary displays of the various organizer features of personal information device 10.

FIGS. 2a–2f are exemplary displays of the six exemplary organizer features that may be selected. FIG. 2a is displayed upon selection of the calendar icon in the main menu of FIG. 1, FIG. 2b is displayed upon selection of the card file (or Rolodex®) icon, FIG. 2c is displayed upon selection of the "to do" list icon, FIG. 2d is displayed upon selection of the memo icon, and FIG. 2e is displayed upon selection of the clock icon. FIG. 2f represents a user customization menu and is displayed upon selection of the toolkit icon.

Generally, the user depresses the appropriate buttons 14, which includes, for example, a main menu button, up and down cursor movement buttons, a select entry button, etc., to manipulate through the various menus and displays of personal information device 10. It is appreciated that the illustrated displays and buttons are provided for purposes of a background understanding of the organizer features of the present invention and are not intended to limit the present invention solely thereto. Since the basic operation of the personal information device having various menus and displays for providing various organizer functions to a user is well known to those of ordinary skill in the art, further description thereof is not provided herein except where necessary for an understanding of the present invention.

The "Reprogramming" Feature

In accordance with the present invention, personal information device 10 includes the capability of receiving "reprogramming" data from a personal computer coupled thereto and reprogramming itself utilizing the downloaded data so as to provide new applications to the user and/or to update the software currently stored in the personal information device. The downloaded applications may include organizer and/or other applications and features for the end user, as well as diagnostic code that is generally utilized during the production of the application and reprogramming code itself As will be discussed, the downloading of data and reprogramming of the personal information device of the present invention is herein identified collectively as the "reprogramming" feature of the personal information device.

Figure 3:
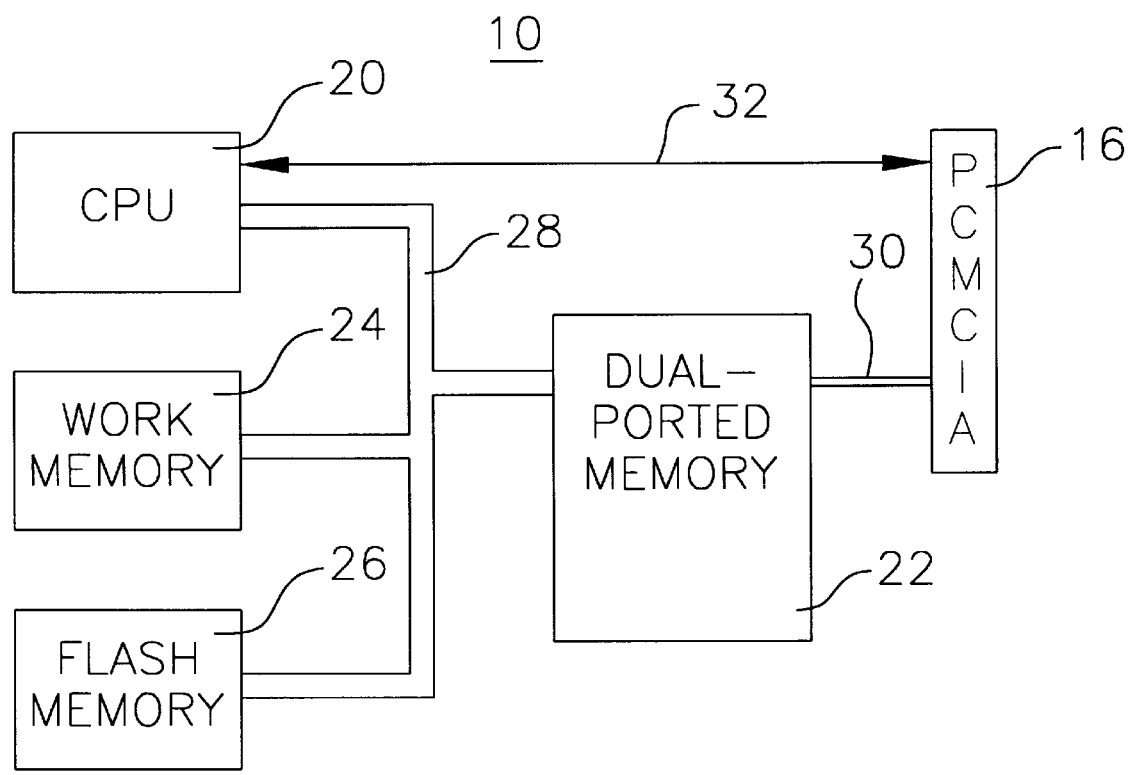
FIG. 3 is a block diagram of personal information device 10 of the present invention.

Referring to the block diagram of personal information device 10 shown in FIG. 3, personal information device 10 includes a processor (CPU) 20, a dual-ported memory 22, a work memory 24, a flash memory 26 and PCMCIA port 16. Although not shown in FIG. 3, personal information device 10 further includes display 12, buttons 14, previously discussed, and a battery for supplying power to the various components. Dual-ported memory 22 is accessible to processor 20 and also to a computer via a bus 30 and PCMCIA port 16 when coupled to personal information device 10. Processor 20 is coupled to work memory 24, flash memory 26 and dual-ported memory 22 via a bus 28. As shown in FIG. 3, work memory 24 and flash memory 26 are not externally accessible. Also, various control signals are provided between processor 20 and the attached computer via lines 32 and PCMCIA port 16.

Personal information device 10 is operable to communicate with a host computer in one of two ways. When the host computer includes a PCMCIA port or slot, and since personal information device 10 is a PCMCIA card, the personal information device may simply be inserted into the computer's PCMCIA port. Insertion of personal information device 10 into the computer's PCMCIA port is identified herein as the direct connection method. If, however, the host computer does not include a PCMCIA port, the docking station of the present invention is utilized to couple personal information device 10 to the computer. As will be discussed, the docking station includes a PCMCIA slot into which personal information device 10 is inserted and a serial connector for connection to the serial port of the computer.

The reprogramming feature of the present invention is carried out in three stages, a downloading stage, an installation stage and a reprogramming stage, and is discussed below with the assumption that the host computer includes a PCMCIA slot into which personal information device 10 is inserted. The first or downloading stage involves the downloading of code from a computer to the personal information device. When personal information device 10 is inserted into the PCMCIA port of a host computer and when appropriate application code in the computer is executed, application and reprogramming code is downloaded to dual-ported memory 22 under the control of the host computer. The application code, the reprogramming code and a special data string, which is used to facilitate the installation stage, are stored in dual-ported memory 22. The application code, reprogramming code and special data string are collectively identified as the reprogramming data. The second or installation stage involves the transferring to work memory 24 of the reprogramming code contained in the reprogramming data stored in dual-ported memory 22. The programming code is transferred so that processor 20 can safely execute it. The final or reprogramming stage involves the execution of the programming code stored in work memory 20 which, in turn, programs flash memory 26, as discussed below. Upon completion of the reprogramming stage, the reprogramming code passes execution to the newly installed application code in the flash memory.

The Downloading Stage

During the downloading stage, the reprogramming data is downloaded from the attached host computer and stored in dual-ported memory 22. In the direct connection method, that is, when personal information device 10 is inserted into the PCMCIA port of the host computer, the host computer addresses dual-ported memory 22 as it would during normal communications with personal information device 10 and stores the reprogramming data in dual-ported memory 22.

When a docking station is used, serial communication device driver software within processor 20 utilizes several pins of PCMCIA connector 16 as serial communications lines, and using an established protocol, the driver stores the reprogramming data (serially transmitted, discussed below) in dual-ported memory 22.

In accordance with the present invention, the reprogramming data is stored at the address locations in dual-ported memory 22 in the manner shown in FIG. 4. As shown, a "Code Update" string of the reprogramming data is stored at a pre-defined address location, the reprogramming code is stored at another pre-defined address location following (or not pre-defined location but immediately following) the code update string, and the new application code (also called flash application code) to be installed into flash memory 26 is stored at a further pre-defined address location following (or not pre-defined location but immediately following) the reprogramming code. As previously mentioned, the code update string (special data string) identifies that the data stored in dual-ported memory 22 is for reprogramming of flash memory 26 and is utilized during the installation stage.

While a particular data structure of dual-ported memory 22 is shown in FIG. 4, other structures are possible. For example, FIG. 5 discloses a structure wherein a reprogramming header stored at a pre-defined address location identifies the address locations at which the reprogramming data and the new application code are stored. In this structure, greater flexibility is achieved by utilizing (e.g., during downloading) only that memory of dual-ported memory 22 that is necessary. For example, user data that is stored in dual-ported memory 22 (prior to the initiation of the reprogramming feature) may be retained (i.e., not overwritten during the downloading stage) for future use by the application software.

Still yet other data structures are possible. For example, the reprogramming and application code may be stored in blocks throughout the memory instead of in contiguous memory. In this instance, dual-ported memory 22 is divided into blocks of pre-defined size with each block beginning with a respective block header. Also, the fragmented code in dual-ported memory 22 can be referenced by an expanded reprogramming header or by a scan of each block header for a special string.

The Installation Stage

When the reprogramming data is stored in dual-ported memory 22, the installation stage begins wherein the reprogramming code is transferred by processor 20 to work memory 24. As previously mentioned, work memory 24 is not accessible via PCMCIA connector 16. Thus, work memory 24 is protected from subsequent downloading of data (write operations) by the host computer thereby providing the desired result that the reprogramming code stored in work memory 24 cannot be overwritten by the host computer during its execution.

In accordance with the preferred embodiment of the present invention, the installation stage does not begin until personal information device 10 card is removed from the computer's PCMCIA slot. The disconnection of personal information device from the host computer causes an interrupt to processor 20 (via lines 32) which, in turn, initiates a routine within processor 20 that controls processor 20 to determine if reprogramming data has been newly downloaded into dual-ported memory 22. If the "Code Update" string is stored at the predefined address within dual-ported memory 22, processor 20 transfers (installs) the reprogramming data stored in dual-ported memory 22 to work memory 24, at which time, the installation stage is complete.

In an alternative embodiment of the present invention, processor 20 periodically polls dual-ported memory 22 to determine if reprogramming data is newly downloaded, for example, by polling for the "Code Update" string. Upon determination that new reprogramming data has been downloaded, processor 20 transfers the new reprogramming data to work memory 24. In this embodiment, installation of reprogramming data into work memory 24 and the subsequent programming of the flash memory (in the next stage) can occur while personal information device 10 is still coupled to the host computer.

The Reprogramming Stage

Upon installation of the reprogramming data into work memory 24, processor 20 passes execution to the reprogramming code stored in work memory 24 to begin the reprogramming stage. The reprogramming code, also called the reprogramming application, carries out a multi-step process of first diagnosing the new application code stored in dual-ported memory 22, then erasing flash memory 26, and finally programming flash memory 26 with the new application code stored in dual-ported memory 22.

Initially, the reprogramming application ascertains the integrity of the newly downloaded application code. This may be achieved in any number of ways including, for example, performing a checksum of the application code. Other diagnostic techniques are well known in the art and therefore are not discussed herein. If the reprogramming application ascertains errors in the application code, it may attempt to correct those errors if the application code also includes appropriate error correction code. If the application code is faulted and not correctable, then the reprogramming feature of personal information device 10 terminates thus preserving the older application code stored in flash memory 26. In an alternative embodiment, the diagnostic step is skipped.

In addition to diagnosing the newly downloaded application code, the status of the power source (i.e., battery) is verified to determine if the power source can provide enough power for the personal information device to erase flash memory 26 and subsequently reprogram flash memory 26 (discussed below). If the power source measures below a predetermined threshold, then it is likely that the reprogramming feature cannot be performed to completion and, thus, the reprogramming feature is terminated at this point (i.e., before the flash memory is erased) thereby preserving the older application code stored in flash memory 26.

The reprogramming application carries out an erasing operation of flash memory 26. However, since the programming algorithm and program/erase block size that are utilized to erase a flash memory is dependent on the type of flash device that is included within personal information device 10, the reprogramming code controls processor 20 to query flash memory 26 for a device ID stored therein. Upon ascertaining the device ID of flash memory 26, the reprogramming application proceeds with the erasing of the flash memory. Since the procedures for erasing various types of flash memories are well known in the art, further description thereof is not provided herein. Alternatively, an auto-erase type flash memory may be utilized thus obviating the need for the reprogramming application to carry out a separate erase function.

When flash memory 26 is fully erased (alternatively, partially erased), controller 20 programs flash memory 26 by transferring thereto the application code stored in dual-ported memory 22. Once flash memory 26 is programmed with the new application code, the reprogramming feature of personal information device 10 is complete, at which time, processor 20 passes execution to the newly installed flash code. In the presently discussed embodiment, the newly installed flash code generally will represent user organizer features including, for example, telephone/address book, memos, and so on. Of course, the flash code may be diagnostic code that is useful for the development of organizer functions and/or other types of functions.

The above-described reprogramming feature is carried out, as previously discussed, by inserting personal information device 10 within the PCMCIA port of a personal computer, downloading reprogramming data from the computer to dual-ported memory 22 of personal information device 10, removing personal information device 10 from the computer's PCMCIA port, transferring the reprogramming code within the downloaded data to work memory 24, executing the reprogramming code within work memory 24 which, in turn, re-programs flash memory 26 with the downloaded application code stored in the dual-ported memory, and upon completion of reprogramming flash memory 26, passing execution to the application code stored in flash memory 26.

In accordance with another embodiment of the present invention, the above-listed "steps", except the last step of passing execution to the application code, is considered to be a single "pass" wherein a multiple number of "passes" are required to fully reprogram the flash memory. In this embodiment, flash memory 26 may be rather large in size relative to the size of dual-ported memory 22, wherein each "pass" causes a different portion of flash memory 26 to be programmed.

When personal information device 10 is inserted into the PCMCIA port of host personal computer, a partial amount of reprogramming data (also identified as a first set of reprogramming data) is downloaded from the computer to dual-ported memory 22. The downloaded first set of reprogramming data includes "first" reprogramming code and "first" application code. Personal information device 10 then is removed from the PCMCIA port of the host computer, at which time, the "first" reprogramming code is transferred to work memory 24. The "first" reprogramming code stored in work memory 24 is executed which, in turn, causes flash memory 26 to be partially reprogrammed (and erased, if necessary) with the "first" application code stored in dual-ported memory 22. The completion of this "first" reprogramming of flash memory 26 is said to complete the first pass.

After the first pass, a second pass is initiated when the user reinserts personal information device 10 into the PCMCIA port of the same host computer, at which point, a second set of reprogramming data (including a second reprogramming code and a second application code) is downloaded from the computer to dual-ported memory 22. Personal information device 10 then is again removed from the PCMCIA port of the host computer, at which time, the second reprogramming code is transferred to work memory 24 and executed which causes flash memory 26 to be again partially reprogrammed (and erased, if necessary) with the second application code stored in dual-ported memory 22. If necessary, third, fourth and even more passes may be carried out if necessary. Upon completion of all the necessary passes, execution is passed to the application code stored in flash memory 26.

In the above-discussed "multiple pass" embodiment of the present invention, flash memory 26 is large in size relative to the other memory components within personal information device 10. By providing for multiple reprogramming passes, it is possible to reprogram a large memory (i.e., the flash memory) utilizing a smaller dual-ported memory as well as a smaller work memory.

The Docking Station

Figure 6:
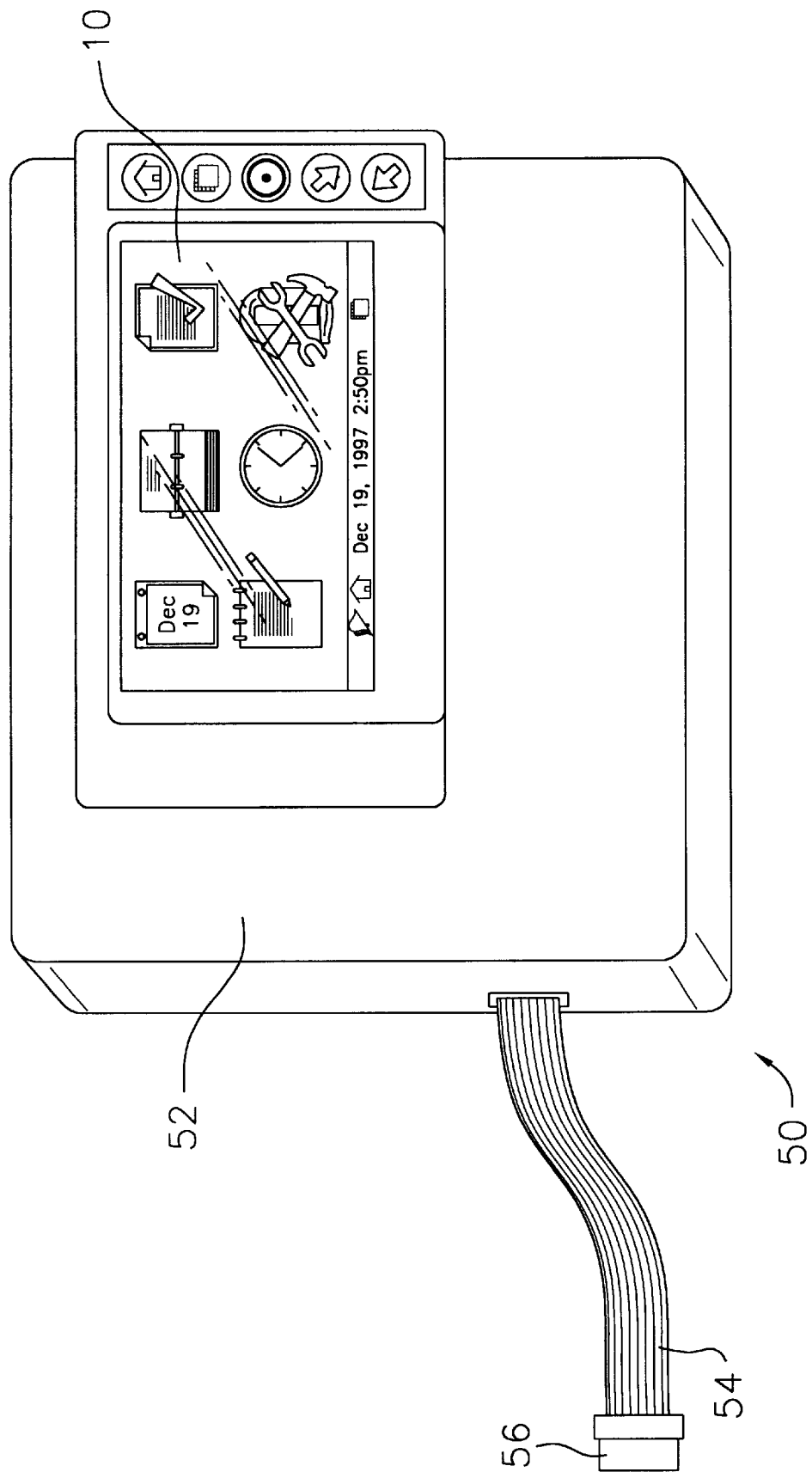
FIG. 6 is a schematic illustration of docking station 50 having personal information device 10 coupled thereto in accordance with the present invention.

In accordance with the present invention, personal information device 10 may connect to a host computer via a docking station. FIG. 6 is a schematic illustration of a docking station 50 having personal information device 10 coupled thereto. Generally, docking station 50 is utilized when the host computer does not include a PCMCIA port. As shown in FIG. 6, docking station 50 includes a main body 52, a cable 54 and a serial connector 56 attached to the end of cable 54. Body 52 of the docking station is shaped in such a manner so that personal information device 10 may be slidable therein. Docking station 50 also includes a PCMCIA connector 62 (hidden in FIG. 6) to which PCMCIA connector 16 of personal information device 10 may be coupled.

Figure 7:
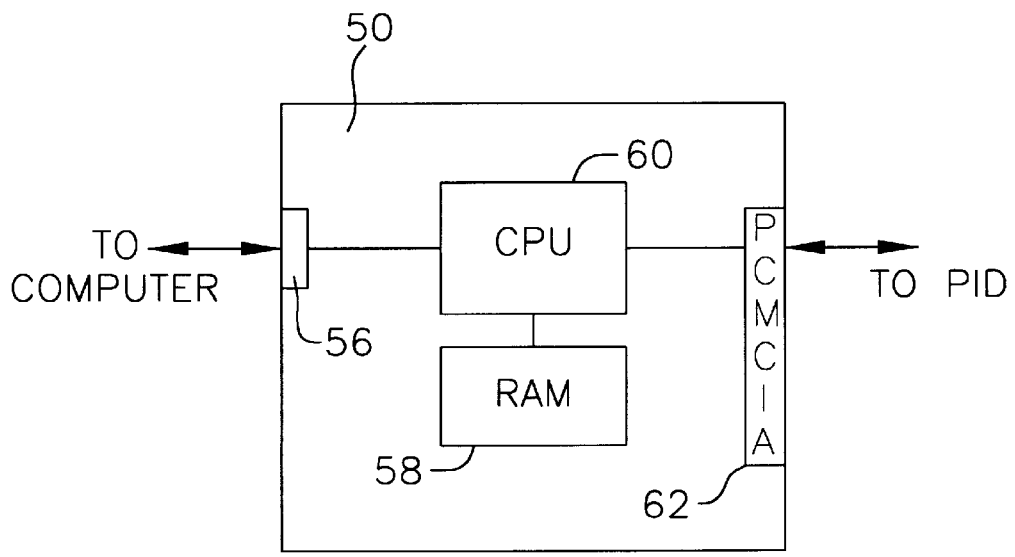
FIG. 7 is a block diagram of docking station 50 of the present invention.

During its use, docking station 50 receives personal information device 10 in the manner shown in FIG. 6 and is coupled to the host computer's serial port via serial connector 56. In another embodiment, docking station includes an appropriate connector, in place of serial connector 56, that is adapted to couple to the host computer's parallel port or to another I/O port of the computer. Referring to the block diagram of FIG. 7, docking station 50 includes serial connector 56, PCMCIA connector 62, a buffer memory (RAM) 58 and a processor (CPU) 60. Alternatively, the buffer memory may be contained within processor 60 itself.

Processor 60 (alternatively, memory 58) includes stored therein docking station executable code for carrying out the baud rate conversion of the present invention. The executable code, also identified herein as the baud rate conversion program or code, provides for a fast and effective transfer rate between personal information device 10 and the host computer. In the preferred embodiment, the baud rate conversation program carries out the fastest serial transfer rate that is possible between the personal information device and the host computer. Generally, the personal information device of the present invention is capable of faster serial communication than typical personal computers. For example, the personal information device may have a baud rate of 67.1875K baud while typical personal computers have a fastest baud rate of 57.6K baud. However, these numbers generally will go up with further developments and cheaper equipment. Even so, it is desirable for the personal information device 10 to be able to interface with any type of personal computer and, thus, the baud rate conversion program of the present invention allows for such interfacing. Without baud rate conversion, the host computer and personal information device would have to communicate at the highest common baud rate of, for example, 9600 baud.

The docking station in combination with the personal information device and the host computer may operate in a first mode in which baud rate conversion is carried out in docking station 50, or in a second mode in which baud rate conversion is not carried out and the host computer and the personal information device are "instructed" to communicate at their highest common baud rate. The application software being executed by the host computer may determine in which of these modes the devices are to operate. In such case, to select the "slow" speed mode (i.e., no baud rate conversion), the host computer transmits a zero byte at 19.2K baud (or less), and to select the "fast" speed mode, the host computer transmits a "FF" at its fast speed of, for example, 57.6K baud. In the slow speed mode, the serially transmitted data simply passes through docking station 50 (i.e., processor 60 simply provides the received serial data as an output). In the fast speed mode, docking station 50 carries out baud rate conversion in the manner discussed below.

Figure 8:
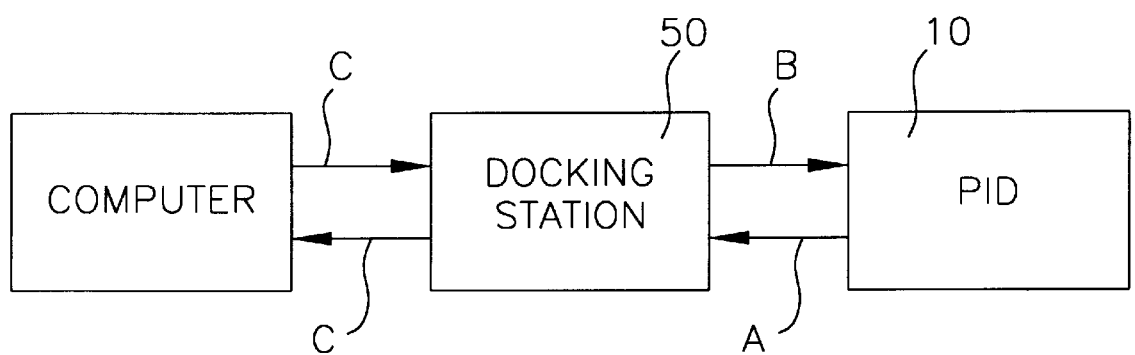
FIG. 8 is a schematic illustration of the coupling of personal information device 10 via docking station 50 to a host computer.

When docking station 50 carries out baud rate conversion in accordance with the present invention, communication between docking station 50 and personal information device 10 of the present invention is always carried out at the personal information device's fastest communication speed of, for example, 67.1875K baud (hereinafter 67.2K), and communication between docking station 50 and the host computer is carried out at the computer's fastest communication speed (or a suitably high speed to facilitate the present invention) of, for example, 57.6K baud. Thus, and referring to FIG. 8, when data is transmitted from personal information device 10 to the host computer, data is first sent from personal information device 10 to docking station 50 at the baud rate "A" of 67.2K baud, and then transmitted from docking station 50 to the host computer at the baud rate "C" of 57.6K baud. For transmissions originating from the computer, data is transmitted from the computer to docking station 50 at the baud rate "C" of 57.6K baud and then transmitted from docking station 50 to personal information device 10 at the baud rate "B" of 67.2K baud. While the "A" and "B" baud rates are the same, communication to docking station 50 from personal information device 10 is distinguished from communication to personal information device 10 from docking station 50 because the bit structure of the transmitted data is different therebetween, as discussed below.

In accordance with the present invention, processor 60 of docking station 50 (in accordance with the baud rate conversion program) "counts" instruction cycle times of the individual instructions being executed within the baud rate conversion program and, at the proper times, inputs and\or outputs bits to\from personal information device 10 and the host computer. That is, each bit of each "framed byte" transmitted\received by docking station 50 follows a previously transmitted\received bit by a predetermined amount of time since both the transmitting and receiving baud rates are known, and since the amount of time for an instruction cycle within processor 60 is known, the time at which a bit is transmitted or received is definable in terms of instruction cycles. In the given example, to maintain the 57.6K baud rate, a bit must be transmitted or received every 17.36 instruction cycles (for the particular oscillator utilized by processor 60), and to maintain the 67.1875K baud rate, a bit must be transmitted or received every 14.9 instructions cycles. As discussed herein, a "framed byte" generally includes data bits (e.g., 8 data bits) and other bits to facilitate serial communication (e.g., start, parity and stop bits).

In accordance with the present invention, Table 1 shown below provides a docking station input/output (receipt/ transmission) schedule of each bit of a respective framed byte that originates from personal information device 10 and that is supplied to the host computer. Moreover, to facilitate proper baud rate conversion of data supplied to docking station 50 at the 67.1875K baud rate from personal information device 10 to the slower 57.6K baud rate of data transmitted from docking station 50 to the host computer, personal information device 10 transmits for each framed byte an additional two bits (an additional parity bit and an additional stop bit) that are subsequently not utilized by docking station 50 and thus not transmitted to the host computer. Additional bits are transmitted from personal information device 10 to docking station 50 so as to effectively slow down the overall byte transfer rate. In the present embodiment, 12 bits are transmitted at the 67.1875K baud rate by personal information device 10 and include: a start bit, 8 data bits, a parity bit and 2 stop bits. The Docking station, in turn, transmits to the host computer 10 bits: a start bit, 8 data bits and a stop bit.

TABLE I

Personal Information Device to Computer -- Input/Output Schedule

| Instruction Cycle | Receive from PID 10 | Transmit to Computer |
|---|---|---|
| 7 | receive start bit | |
| 9 | | send start bit |
| 22 | receive data bit 0 (15) | |
| 26 | | send data bit 0 (17) |
| 37 | receive data bit 1 (15) | |
| 44 | | send data bit 1 (18) |
| 52 | receive data bit 2 (15) | |
| 61 | | send data bit 2 (17) |
| 67 | receive data bit 3 (15) | |
| 78 | | send data bit 3 (17) |
| 82 | receive data bit 4 (15) | |
| 96 | | send data bit 4 (18) |
| 97 | receive data bit 5 (15) | |
| 112 | | send data bit 5 (16) |
| 113 | receiye data bit 6 (16) | |
| 127 | receive data bit 7 (14) | |
| 131 | | send data bit 6 (19) |
| dnc | receive parity bit (dnc) | |
| 148 | | send data bit 7 (17) |
| dnc | receive 1$^{st}$ stop bit (dnc) | |
| 165 | | send stop bit (17) |
| dnc | receive 2$^{nd}$ stop bit (dnc) | | dnc: do not care

Referring to Table 1, a start bit is received from personal information device 10 at instruction cycle 7 which, in turn, causes a start bit to be transmitted to the computer at instruction cycle 9. Processor 60 of the docking station then polls its serial input port at instruction cycle 22 to receive data bit 0, and docking station 50 transmits data bit 0 to the computer at instruction cycle 26. The number of cycles that have passed from the previous input/output is shown in parenthesis in Table 1. As shown, there are between 14 to 16 cycles between the occurrence of two successive inputs from personal information device 10, which reflects the 14.9 instruction cycles per bit at the 67.2K baud rate, and there are between 16 to 19 cycles between the occurrence of two successive outputs to the host computer, which reflects the 17.36 instruction cycles per bit at the 57.6K baud rate. Furthermore, Table 1 does not identify the instruction cycles at which the parity and 2 stop bits are received primarily since the times of reception of these bits are unimportant to the times at which bits are output to the computer. Finally, received data bits are temporally buffered within docking station 50 when necessary so that they may be supplied out at the appropriate instruction cycle.

When data is transmitted from the host computer via docking station 50 to personal information device 10, the baud rate of the transmitted data is increased from the computer's transmission baud rate of 57.6K baud to the personal information device's reception baud rate of 67.1875K baud. In accordance with the present invention, Table 2 shown below provides a docking station input/output (receipt/transmission) schedule of each bit that originates from the host computer and that is supplied to personal information device 10. In addition, to facilitate a proper decrease in baud rate, docking station 50 adds an additional bit to each framed byte supplied by the host computer. In the present embodiment, the host computer supplies to the docking station 10 bits: a start bit, 8 data bits and a stop bit, which 10 bits have the same structure as the 10 bits supplied to the host computer during personal information device to computer communication, discussed above. The docking station transmits to the personal information device 11 bits: a start bit, 8 data bits, a parity (set) bit and a stop bit. The parity bit in the preferred embodiment is simply a set bit, but may be a reset bit or an actual parity bit.

TABLE II

Computer to Personal Information Device -- Input/Output Schedule

| Instruction Cycle | Receive from Computer | Transmit to PID 10 |
|---|---|---|
| 4–11 | receive start bit | |
| 26 | receive data bit 0 | |
| 32 | | send start bit |
| 43 | receive data bit 1 (17) | |
| 47 | | send data bit 0 (15) |
| 61 | | send data bit 1 (14) |
| 62 | receive data bit 2 (19) | |
| 77 | | send data bit 2 (16) |
| 78 | receive data bit 3 (16) | |
| 92 | | send data bit 3 (15) |
| 95 | receive data bit 4 (17) | |
| 106 | | send data bit 4 (14) |
| 113 | receive data bit 5 (18) | |
| 121 | | send data bit 5 (15) |
| 130 | receive data bit 6 (17) | |
| 136 | | send data bit 6 (15) |
| 148 | receive data bit 7 (18) | |
| 151 | | send data bit 7 (15) |
| 165 | receive stop (17) | |
| 167 | | send parity (set) (16) |

Referring to Table 2, a start bit is received from the host computer sometime between instruction cycle 4 and 11, and then data bit 0 is receive at instruction cycle 26. The data bit is buffered and a start bit is transmitted to personal information device 10 at instruction cycle 32. Data bits 1–7 and the stop bit are received by docking station 50 at the instruction cycles indicated in the table, and data bits 0–7 are transmitted from docking station 50 to personal information device 10 at the instruction cycles indicated. Finally, a parity (set) bit is supplied to personal information device 10 at instruction cycle 167, and thereafter a stop bit is transmitted to personal information device 10. In the preferred embodiment, the values of the parity and stop bits are the same and, thus, the output remains the same to supply the stop bit after the parity (set) bit.

The docking station of the present invention, as discussed above, uses instruction cycles to determine when bits are to be input or output to a connected device. In an alternative embodiment of the present invention, a timer is utilized wherein the baud rate conversion program provides for receiving or outputting a respective bit at a time that is a function of the timer value and the baud rate at which the data is input or output. If the timer is reset after receiving/ outputting each bit, then the timer value itself identifies the passage of time after reception/transmission of the previously input/output bit. If the timer is not reset, then bits are received/output at predetermined timer values. One or more timers may be utilized. In one embodiment, a first timer is provided for received bits and a second timer is utilized for output bits.

As discussed above, the personal information device of the present invention, whether or not used in combination with the docking station of the present invention, includes therein the capability of re-programming its own flash memory with new/revised application code. The reprogramming feature of the present invention provides for safe reprogramming by utilizing a separate work memory that is not accessible to the host computer for reprogramming purposes and by providing a mechanism for verifying that newly downloaded application code is error free prior to the reprogramming of the flash memory. In addition, the PCMCIA card design of the personal information device is perfectly suited for mobile use but with advantageously powerful organizer capability. The personal information device's reprogramming feature further provides for easier development of application code. Finally, the docking station of the present invention allows the personal information device to interface with a host computer that does not include therein a PCMCIA port, and further provides the advantageous feature of allowing the host computer to communicate with the personal information device at its fastest baud rate.

The Wallet

Figure 9:
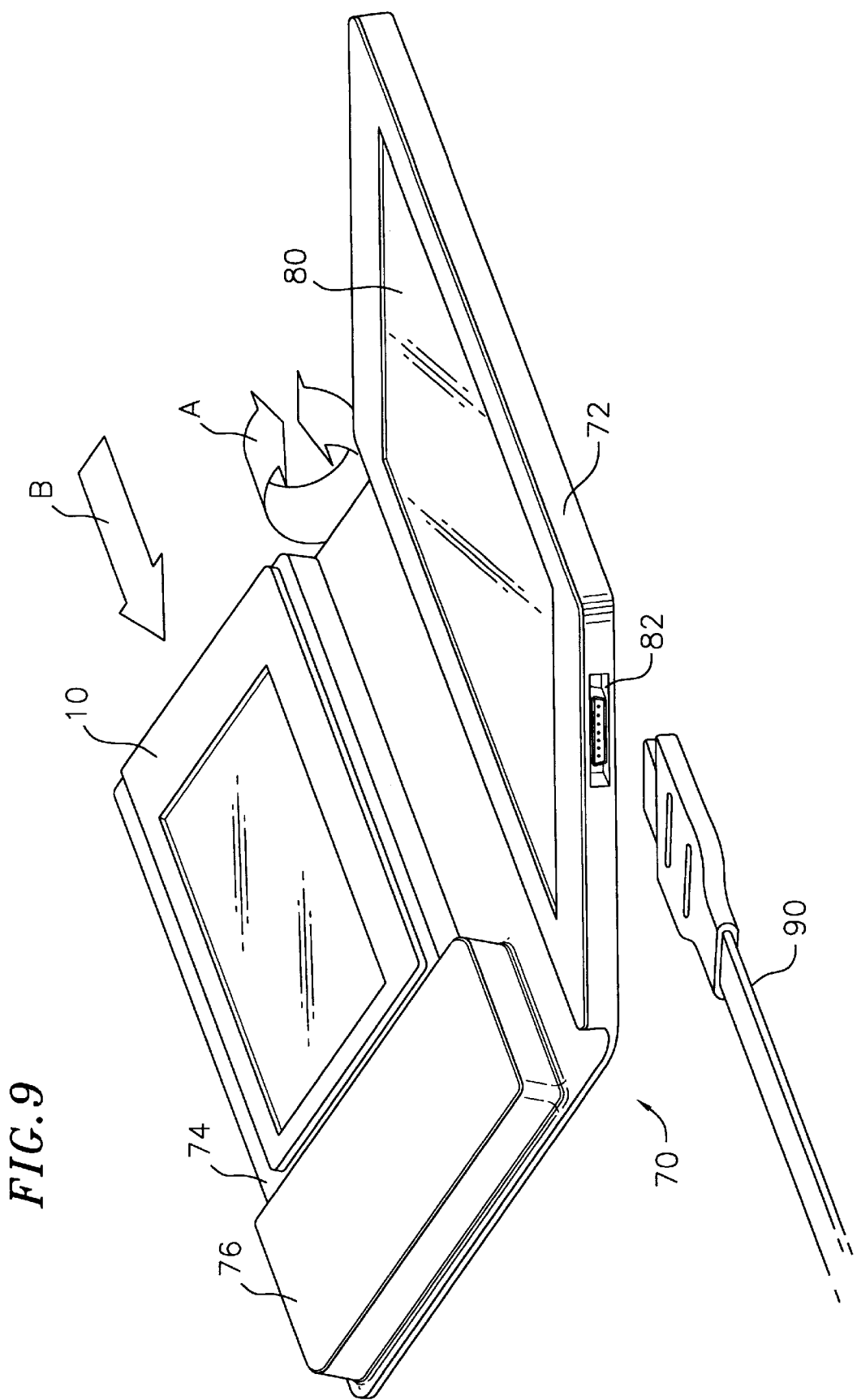
FIG. 9 is an exemplary schematic illustration of wallet 70 of the present invention having personal information device 10 inserted therein.

In accordance with the present invention, a flexible wallet, e.g., a leather wallet, may be used in combination with the above-described personal information device, as well as with other similar types of devices. FIG. 9 is an exemplary schematic illustration of wallet 70 having personal information device 10 inserted therein. As shown, wallet 70 includes bottom and top halves 72, 74 (or left, right halves, etc.) that may be opened/closed (represented by arrows "A") in a "wallet" like manner. Bottom half 72 includes a touchpad 80 and optionally may include a serial connector 82 to which a cable 90 may be coupled (to be discussed). Top half 74 may include a device holder 76 that operates to hold a personal information device when inserted therein in the direction shown by arrow "B". Alternatively, the device holder may be a strap or other suitable device that holds the personal information device in place.

Figure 10:
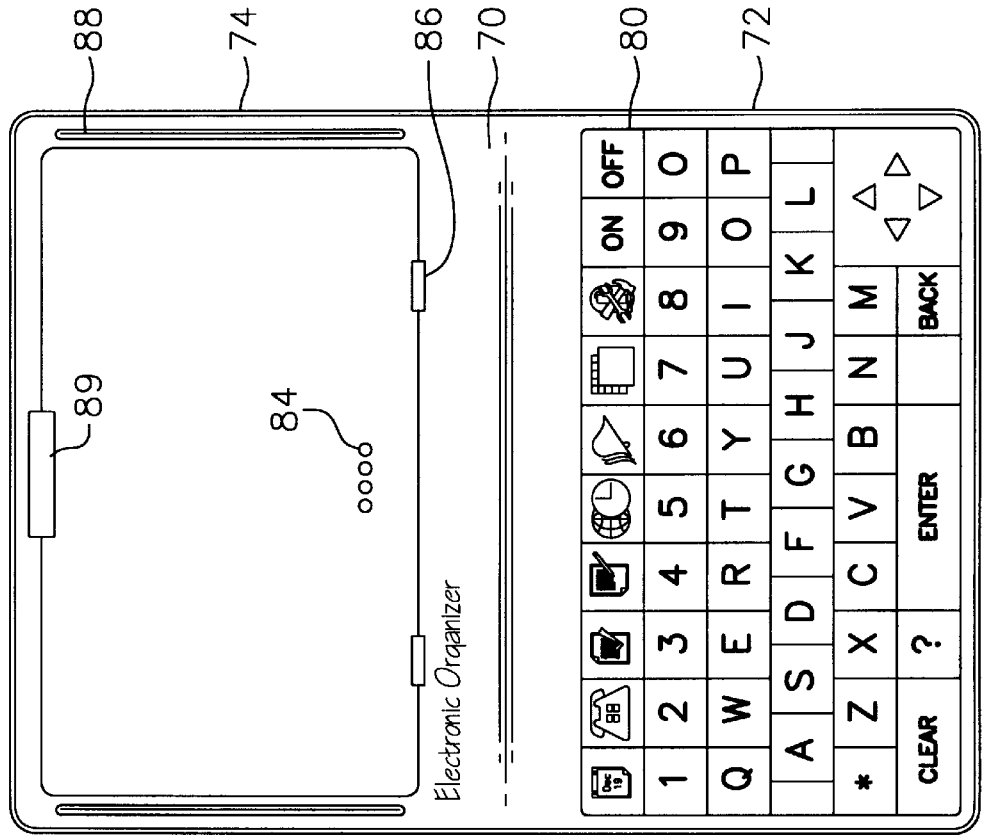
FIG. 10 is another illustration of wallet 70 of the present invention.

Referring to FIG. 10, which illustrates wallet 70 without the personal information device coupled thereto, top half 74 of wallet 70 includes contact pins 84 which operate to make contact with appropriate opposing surfaces on the back of personal information device 10 for electrical connection thereto. Contact pins 84 are electrically connected to touchpad 80 and operate as the input/output terminal of touchpad 80. In one embodiment of the present invention, and as will be discussed, personal information device 10 via contact pins 84 provides a source of power to touchpad 80. Contact pins 84 also function as an output to personal information device 10 by supplying a signal thereto that represents the user input on touchpad 80.

Wallet 70 further includes hooks 86 that assist in holding device 10 once inserted, guiders 88 that operate to guide device 10 into wallet 70 for proper insertion therein, and a snap 89 that maintains wallet 70 in its closed position (with bottom and top halves 72, 74 touching).

Figure 11:
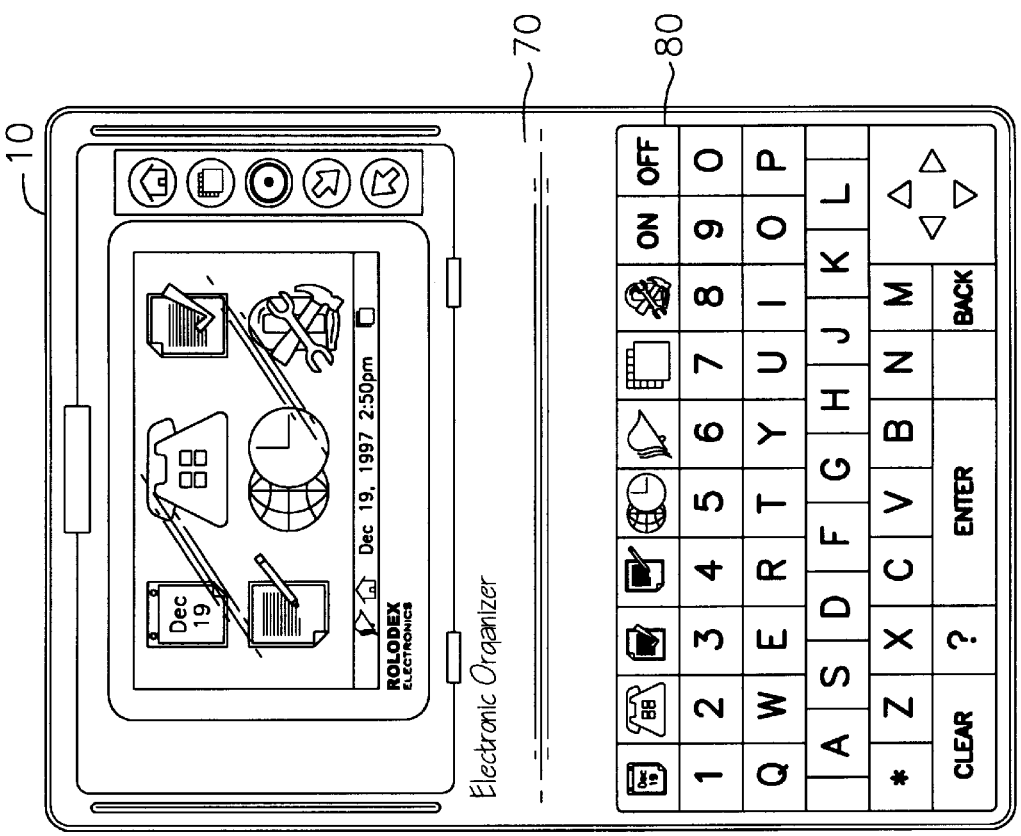
FIG. 11 is a further illustration of wallet 70 having personal information device 10 inserted therein.

When personal information device 10 is inserted within wallet 70, such as shown in both FIGS. 9 and 11, both the display and the input buttons of device 10 are readable\accessible to the user, and wallet 70 operates to allow a user to input data and other information into device 10 in a number of ways. In operation, personal information device 10 detects when it is coupled to wallet 70 in any appropriate fashion, for example, by polling its electrical surfaces (that are intended to make contact with contact pins 84) for input thereto, by means of an interrupt, or other method that is known in the art. When connection to wallet 70 is detected, personal information device 10 generally provides to the user all of the functions and features that are provided when not connected to wallet 70, but further provides various additional features including, for example, those features that are provided to the user via the host computer, as previously discussed. Such features include telephone/address book entries, note entries, appointment entries, and so on.

In a preferred embodiment of the present invention, contact pins 84 as well as opposing electrical surfaces on the personal information device are not utilized and, instead, communication between wallet 70 and personal information device 10 is carried out by the use of electro-magnetic induction. Communication via electromagnetic induction is contactless and, thus, external components are unnecessary for wallet 70 to provide data to personal information device 10 and for personal information device 10 to provide data to wallet 70. In this preferred embodiment, one coil (not shown) is provided within the personal information device and one coil (also not shown) is provided, for example, on a rigid board such as a small PC board within the top half 74 of the wallet. The PC board within the top half of the wallet may include the necessary circuitry to couple the wallet's coil to touchpad 80.

As is appreciated, communication between wallet 70 and personal information device 10 via electromagnetic induction provides various advantages over hard-wired or electrically coupled communication (e.g., via pins 84). Pins are susceptible to wear and breakage, and communication between the devices is prone to errors when the metal surfaces are not clean. Moreover, exposed electrical contacts often present an electrostatic discharge (ESD) problem and generally require that there be a tight physical and aligned connection between the devices to ensure proper contact.

When wallet 70 and personal information device 10 are designed to communicate via electromagnetic induction, and not by direct electrical contact, wallet 70 requires its own power source (e.g., battery). In accordance with the present invention, the input device (i.e., touchpad 80) of wallet 70) remains "off" (i.e., essentially unpowered), so as to maximize battery life, unless an attached personal information device is on. Wallet 70 is "on" (i.e., the input device of the wallet is powered) when the attached personal information device is on. To "wake up" wallet 70, personal information device 10 sends a so-called "wake" signal which is, for example, a burst on a 10 KHz carrier signal, via the induction coils to the wallet. When the circuitry within wallet 70 detects the 10 KHz signal, touchpad 80 is automatically turned on. In a preferred embodiment, the personal information device is designed to send a so-called "stay awake" signal periodically (e.g., every 5 seconds, every 30 seconds, every 60 seconds, etc.) and wallet 70 is designed to remain awake if the stay awake signal is received periodically. If wallet 70 doesn't receive the stay awake signal within a predetermined time period, the input device (i.e., the touchpad) of wallet 70 is de-powered. In this instance, battery life of the wallet is preserved if the personal information device is turned off or if the personal information device is removed from wallet 70. Once turned on, wallet 70 transfers data serially to personal information device 10 using, for example, bursts on an 80 KHz carrier. The received signal is converted within personal information device 10 to the appropriate data.

Figure 12A:
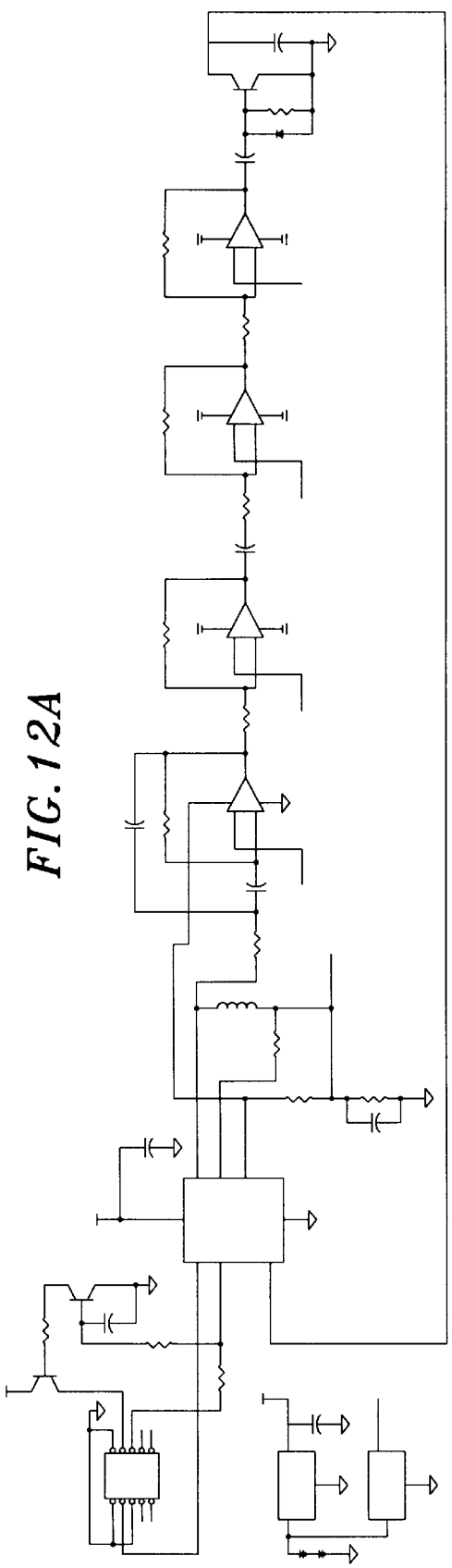
FIGS. 12A and 12B are schematic diagrams of exemplary induction circuits of wallet 70 and personal information device 10.
Figure 12B:
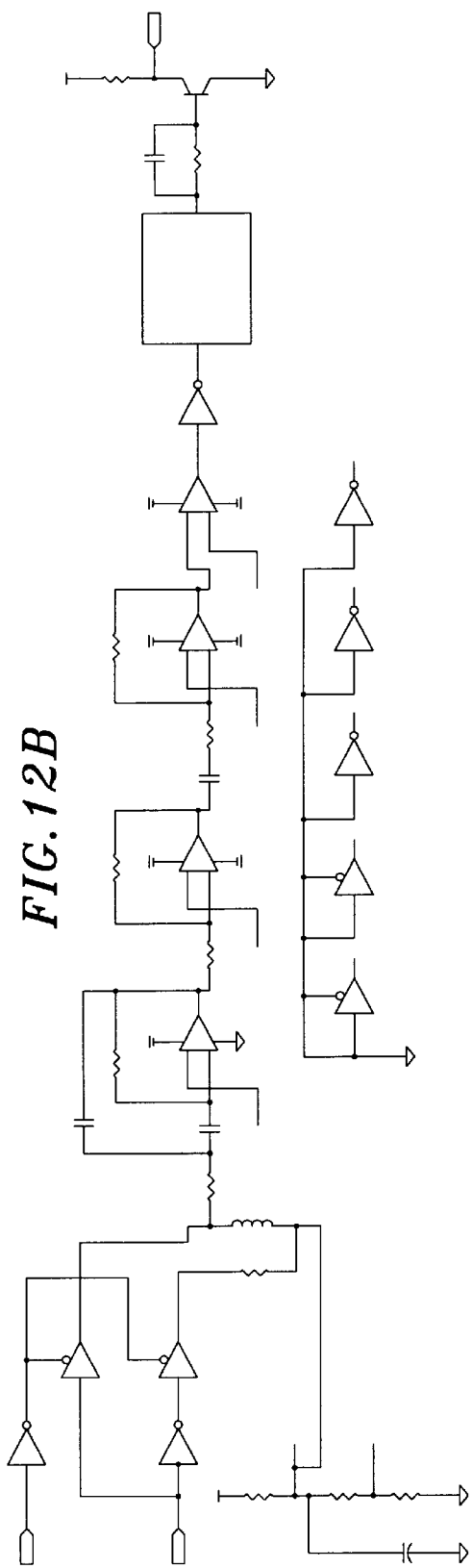

FIGS. 12A and 12B schematically illustrate exemplary circuits that can be utilized within wallet 70 and personal information device 10, respectively. The touchpad 80 hardware may be coupled to a small microcomputer to drive the wallet's coil, and in order to wake the wallet (i.e., touchpad 80), a bandpass filter (alternatively, a microcontroller) filters out all but the 10 KHz signal used by the personal information device to signal that it is on. Within personal information device 10, circuitry to drive device 10's induction coil to signal that device 10 is on may be built into the ASIC of the personal information device. Also circuitry is built into the ASIC to convert the 80 KHz signal into serial data. A bandpass filter is utilized to filter out all but the 80 KHz signal. Since the particular operations of the circuits shown in FIGS. 12A and 12B are known to one of ordinary skill in the art, a detailed description of the operation of these exemplary circuits is omitted herein. Of course, other known, appropriate circuits may be utilized.

In accordance with an embodiment of wallet 70 of the present invention, touchpad 80 is silk-screened with a complete keyboard, such as shown in FIGS. 10 and 11, and thus all entries that can be made via a computer keyboard can be made via the keyboard on touchpad 80. Touchpad 80 may be a pressure-sensitive type display. However, in the preferred embodiment of the present invention, touchpad 80 is a Cirque GlidePoint® touchpad which is based on electrical capacitance and which does not require pressure or direct contact. Such touchpad contains a two-layer grid of electrodes which are connected to an integrated circuit mounted on the reverse side of the touchpad, the first (upper) layer containing vertical electrode strips and the second (lower) layer containing horizontal electrical strips. Mutual capacitance from each of the horizontal electrodes to each of the vertical electrodes, and which is modified by the presence of a human finger, is measured by the touchpad's integrated circuit. FIG. 13 schematically illustrates the operation of the touchpad. Upon detection of the human finger, touchpad 80 supplies as an output (via contacts 84 or electromagnetic induction) the coordinates of the finger position and the personal information device identifies the selected key as a function of the supplied coordinates. Alternatively, touchpad 80 supplies as an output a signal representing a data value that identifies the selected key (e.g., 1="A", 2="B", etc.).

In the presently discussed embodiment, wallet 70 advantageously allows a user to enter all necessary information into personal information device 10 without the need for a host computer. As shown in FIGS. 9–11, wallet 70 is compact and conforms to the shape of personal information device 10 thus allowing one to easily utilize wallet 70 in combination with personal information device 10 at all times.

In accordance with another embodiment of the present invention, touchpad 80 is replaced with a touch-sensitive (pressure sensitive or alternatively, non-pressure sensitive) display that is operable to display an image (display) thereon in accordance with a signal(s) (i.e., data) supplied from personal information device 10 thereto via contact pins 84 or electro-magnetic induction. In this embodiment, the display on the touch-sensitive display varies in accordance with the user-selected function to facilitate ease of use of that particular function. For example, upon user selection of the appointment schedule feature, personal information device 10 supplies to wallet 70 an appropriate signal (i.e., data) so that a calendar is displayed by the touch-sensitive display of wallet 70 and the user simply selects (i.e., touches) that day/date at which an appointment is to be scheduled. Upon selection of the desired day/date, the display of wallet 70 may then be controlled by personal information device 10 to display different times of the day (e.g., 9 a.m., 10 a.m., etc.) for selection by the user. Flat panel display 12 of personal information device 10 may, during each step mentioned above, provide instructions to the user as well as any other information to facilitate ease of use of the device. Wallet 70 may include a buffer memory for storing therein the display data supplied from personal information device 10. Alternatively, the memory within wallet 70 may be a non-volatile memory having pre-stored therein data pertaining to plural displays and thus the display data mentioned above that is supplied from personal information device 10 may simply identify which of the pre-stored displays wallet 70 is to provide to the user.

In accordance with a further embodiment of wallet 70 of the present invention, touchpad 80 provides for user input via drawing with a finger or stylus (i.e., "inking"). The drawn input, representing, for example, a memo or note, may be stored as a graphic within personal information device 10. Alternatively, personal information device 10 includes appropriate recognition software that converts the drawn information into text data that is then stored in memory.

In accordance with yet another embodiment of wallet 70 of the present invention, top half 74 of wallet 70 includes a PCMCIA connector, for example, within holder 76 shown in FIG. 9, to which the PCMCIA connector of personal information device 10 may be directly coupled. In this embodiment, wallet 70 generally will not require contact pins 84 or electromagnetic induction technology. The various power and data signals are supplied via the respective PCMCIA connectors of wallet 70 and personal information device 10. The operation of wallet 70 having a PCMCIA connector may be similar to those embodiments previously discussed.

Referring back to FIG. 9, and as previously mentioned, wallet 70 may include a serial connector 82 to which a cable 90 may be coupled for the purpose of interfacing personal information device 10, when inserted into wallet 70, to a host computer. Cable 90 may include attached thereto a serial connector or other type of connector, (not shown) that may be connected to the serial or other port of the host computer. Cable 90 may even be attached to a PCMCIA card that can be inserted into the PCMCIA port of the host computer. Still further, cable 90 may be attached to a device that functions in a manner similar to that of docking station 50, previously discussed, to carry out baud rate conversion. When wallet 70 has inserted therein personal information device 10 and is also coupled to a host computer, for example, via cable 90, any and all of the previously discussed features may be performed, including the downloading of reprogramming data from the host computer to personal information device 10 and/or the downloading of user-entered data (e.g., appointment information, address/telephone information, etc.). In addition, the added capability of uploading data from personal information device 10 may be provided since personal information device may include information therein that is entered thereto via wallet 70 and that is not reflected in the host computer.

In accordance with another embodiment of the present invention, serial connector 82 of wallet 70 may be coupled via cable 90 (or other suitable cable) to any one of a number of peripheral devices including, for example, a modem, a facsimile machine, another personal information device, embodying the present invention and so on. The application code within personal information device 10 inserted within wallet 70 provides the appropriate signals to the attached peripheral device.

While the present invention has been particularly shown and described in conjunction with preferred embodiments thereof, it will be readily appreciated by those of ordinary skill in the art that various changes may be made without departing from the spirit and scope of the invention. For example, although the present discussion is directed to a wallet into which the above-described personal information device may be inserted, the disclosed wallet may be designed to accept devices of other shapes and sizes, as well as devices that carry out different functions than those mentioned herein.

As another example, although the wallet of the present invention has been described as having a particular shape and size, e.g., a two-fold wallet, the wallet may be of a different shape and size (e.g., a three-fold type wallet, a wallet with folds along perpendicular axes, etc.).

Therefore, it is intended that the appended claims be interpreted as including the embodiments described herein, the alternatives mentioned above, and all equivalents thereto.

What is claimed is:

1. A wallet in combination with a personal information device, the combination comprising:

a personal information device having a display, an input device and an induction coil; and a wallet having an input device and an induction coil, said wallet being adapted to receive and detachably retain said personal information device, and said induction coil of said personal information device and said induction coil of said wallet are adapted to communicate with each other without electrical contact there between when said personal information device is retained by said wallet;

wherein said input device of said wallet is operable to be turned on and off; said personal information device includes means for supplying a wake signal to said wallet when said personal information device is retained by said wallet; and said wallet further includes control means for operatively controlling said input device of said wallet to turn on in response to receipt of said wake signal by said wallet.

2. A wallet in combination with a personal information device, the combination comprising:

a personal information device having a display, an input device and an induction coil; and a wallet having an input device and an induction coil, said wallet being adapted to receive and detachably retain said personal information device, and said induction coil of said personal information device and said induction coil of said wallet are adapted to communicate with each other without electrical contact there between when said personal information device is retained by said wallet;

wherein said input device of said wallet is operable to be turned on; said personal information device includes means for controlling said induction coil of said personal information device to supply a wake signal to said wallet; and said input device of said wallet is adapted to be automatically turned on when said induction coil of said wallet receives said wake signal.

3. The combination of claim 2, wherein said means for controlling controls said induction coil of said personal information device to supply a stay-awake signal periodically.

4. The combination of claim 3, wherein said input device of said wallet is adapted to turn off if a stay-awake signal is not received by said wallet within a predetermined period of time after receiving a previously received stay-awake signal.

5. A wallet in combination with a personal information device, the combination comprising:

a personal information device having a display, an input device and an induction coil; and a wallet having an input device and an induction coil, said wallet being adapted to receive and detachably retain said personal information device, and said induction coil of said personal information device and said induction coil of said wallet are adapted to communicate with each other without electrical contact there between when said personal information device is retained by said wallet;

wherein said wallet includes a limited power source for supplying power to said wallet; and said input device of said wallet is adapted to utilize power supplied from said limited power source when a wake signal is received by said induction coil of said wallet; and said personal information device includes means for controlling said induction coil of said personal information device to supply said wake signal when said personal information device is turned on and is retained by said wallet.

6. A method of communication between a personal information device and a wallet having an input device therein, said wallet adapted to receive and detachably retain said personal information device, said method comprising the steps of:

mechanically coupling said personal information device to said wallet;

supplying from said personal information device to said wallet a wake signal after said personal information device and said wallet are coupled;

receiving by said wallet said wake signal supplied by said personal information device; and turning on said input device of said wallet automatically in response to said wallet receiving said wake signal;

wherein said step of supplying is carried out by supplying said wake signal via an induction coil of said personal information device; and said step of receiving is carried out by an induction coil of said wallet.

7. The method of claim 6, further comprising the step of supplying from said personal information device to said wallet a stay-awake signal periodically.

8. The method of claim 6, further comprising the step of turning off said input device of said wallet if said wallet does not receive a stay-awake signal within a predetermined period of time after receiving a previously received stay-awake signal.

* * * * *